UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

PROCESS OF MAKING BRIQUETS OR OTHER MOLDED ARTICLES.

14,653. Specification of Reissued Letters Patent. Reissued May 27, 1919.

No Drawing. Original No 1,246,805, dated November 13, 1917, Serial No. 757,301, dated March 28, 1913. Application for reissue filed March 21, 1918. Serial No. 284,223.

*To all whom it may concern:*

Be it known that I, CARLETON ELLIS, a citizen of the United States, and a resident of Montclair, in the county of Essex and State of New Jersey, have invented certain new and useful Improvements in Processes of Making Briquets or other Molded Articles, of which the following is a specification.

This invention relates to a method of making briquets and other solid or plastic bodies by means of sulfite waste liquor as a binding material and to the product of such method, all as more fully hereinafter set forth.

Sulfite waste liquor in a concentrated or solid form has been proposed as a binding material for briquets and the like, but being soluble in water briquets made from it will not stand the action of wet weather as when exposed to rain in open cars during transportation. Pitch and tar have been suggested as waterproofing agents for the sulfite liquor but owing to the smoke and soot produced by these there is little likelihood of general acceptance of binders of this character.

Many attempts have been made to render sulfite liquor waterproof but so far as I know, no satisfactory method to this end for making briquets and plastics has been devised.

I have found that the concentrated liquor, especially the more acid types of the sulfite waste liquor, are capable of being precipitated by lime to form a perfectly insoluble body so far as this art is concerned, and whch enables briquets to be prepared which resist the disintegrating effects of water to the degree desired. It is of course somewhat remarkable that sulfite waste liquor consisting so largely of lime compounds should be precipitated by quicklime or hydrated lime, but such is the case, especially with the slightly acid varieties of the liquor. The liquors obtained from raw materials containing a rather high percentage of magnesia are preferable.

The product may be used for making flooring compounds, artificial stone, columns, and all sorts of plastics, as will now be evident.

In carrying out the method I take sulfite liquor preferably of an acid character, such as may be made by concentrating in an acid condition or partially neutralized state, or by acidifying the neutral concentrate. I do not mean to exclude the neutral or alkaline, or hydrolyzed, or other forms or derivatives of sulfite waste liquor or spruce or other cellulosic liquors of a substantially equivalent character from the viewpoint of the present invention. The liquor is mixed with the materials to be bound together as coal dust or fines, culm, sawdust, mineral fillers, talc, magnesite, crushed rock, sand, fiber, asbestos, and the like, and then the lime in a finely divided condition is admixed therewith. Reaction takes place almost immediately with some liquors and the insoluble compound is formed in and around the filling material. Sometimes the reaction is not immediate, especially when the sulfite liquor is diluted with 20 to 50% of water or when the sulfite liquor solids are (because of the nature of the concentration) in a less unstable condition. Thus in various ways the setting time may be controlled so that opportunity is afforded to work the plastic into suitable shape after mixing. Hydrated lime works usually a little slower than quicklime. About 50% of lime reckoned on the weight of sulfite liquor of 30 degrees Baumé is a satisfactory amount of precipitant. 30% and even less will serve but the setting time is greatly protracted, which of course for some purposes may not be undesirable. From 30–50% is however recommended for general operation. This may be exceeded in some cases.

In preparing a briquet from culm or coal material of various sorts the sulfite liquor may be mixed with this material to uniformly coat the particles thereof and the lime in fine powder may then be admixed, or the coal may first be floured with the lime and the sulfite liquor is then added and thoroughly incorporated, briqueting following as soon as possible. Or the lime may be added in the form of the hydrate dry or as a paste or as a milk or cream of lime. To secure the best results briqueting or forming into shape should take place before any substantial amount of setting has occurred.

The action of the lime or other precipitant employed is that of true precipitation or coagulation, as the product of the reaction, in its preferred form is unattacked even by boiling water although the sulfite liquor in the acid form preferably used is readily soluble in cold water.

On the weight of the coal employed from 6 to 10 per cent. of sulfite liquor may be used, the proportion varying between these or other limits according to the character of the coal, amount of briqueting pressure and so forth. The coal particles need not be uniformly coated with the sulfite liquor provided sufficient of the latter be present to secure the required bonding effect.

Tests made with such briquets by exposing to a strong spray of water showed a plain sulfite liquor briquet (*i. e.* without lime) to fall to pieces in 10 minutes while the limed product resisted perfectly for a period of four hours when the test was discontinued.

Although the reaction takes place readily in the cold with the lime reagent as above, heat may be employed if desired to modify the reaction. When precipitants other than lime are used the conditions should be adjusted to meet any modification of the reaction under the circumstances. Similarly although the process is described more particularly with reference to the production of briquets it will now be evident that the reaction may be applied to other fields where it is desired to precipitate sulfite liquor to yield an insoluble product, especially as distinguished from "salting out" procedures known in the art. Thus flooring, tool handles, blocks and all kinds of molded products may be obtained. Added to paper stock in the beater engine, the sulfite liquor may be thrown down with lime or similar precipitant, giving a sizing material which serves for some of the darker shades of paper at least, and such size may be used in conjunction with rosin or other size if desired.

For convenient shipment and certain other reasons including readiness with which the material may be incorporated with the coal or similar stock, the sulfite liquor may be dried to a solid and ground to a powder or dried by atomization in an atomizing system which yields the material in a pulverulent condition. This powder is then mixed with the coal, lime being added either before or after or with such mixture, and water incorporated so as to cause the reaction either in the bulk mass or after forming the briquets.

Similarly a pulverulent product consisting of a mixture of the dry sulfite liquor solids and hydrated lime may be prepared as a binder, this feature being especially claimed in my copending application Serial No. 201,807, filed November 13, 1917.

Other precipitants than lime may be employed as stated. Preferably however a basic body such as lime or barium hydrate is recommended and preferably with the acid sulfite of cellulose waste liquor, it being desirable to have only a moderate degree of acidity to permit of the reaction taking place with effectiveness.

Barium hydrate is not so powerful a precipitant as calcium hydrate, on some liquor. Lime is a specific precipitant.

Another consideration is that in the case of briquets it becomes necessary to consider the ash of the fuel. Any addition of sulfur compounds such as pyrite is of course regarded as objectionable, while lime is even advantageous as it softens the clinker rendering same less likely to freeze to the stove fire box or grates. With 6% of sulfite liquor and 3% of lime the resulting ash is not objectionable in the case of most grades of coal, both anthracite and bituminous.

Finally in recapitulation it should be stated that although I lay claim broadly to the novel reaction hereinbefore set forth, I principally indicate concentrated acid sulfite waste liquor or its solids, diluted as may be desired, as a binding material, precipitated by means of the specific precipitant quicklime or lime material, as calcium saccharate and the like, such acid sulfite liquor being preferably in a colloidal and unstable form due to such concentration under these conditions so that the act of neutralization or over-neutralization (an excess of precipitating agent being preferably employed) induces not merely chemical combination but a polymerization or some similar form of coagulation the exact nature of which I do not herein attempt to describe. While lime exerts this effect calcium chlorid does not yield the same results. Probably the removal of the excess of sulfite liquor and possibly some in combination with the solids of the liquor, which occurs during the treatment connected with concentration, places the solids or some of them in an unstable condition and the addition of the lime by further combination under these peculiar conditions causes the effects observed. The bulking agent or material hereinafter mentioned is the material employed as the filler or the essential material to be bound together as aforesaid.

It will be readily understood that, by the concentration of waste sulfite liquor, the product is rendered substantially free from sulfurous acid so that the action of sulfurous acid on the added lime is avoided, and sulfur, which is objectionable in briquets, is reduced to a minimum. It will also be readily understood from the foregoing description that, by reason of the chemical reactions which take place during concentration, the constituents of the sulfite liquor which are acted upon by the lime in my process, are in a chemically unstable condition as compared with their condition in unconcentrated sulfite liquor, so that, upon the addition of lime, the negative ions of the precipitant are seized upon with peculiar avidity and a different product obtained from that resulting from the action of lime upon unconcentrated sulfite liquor.

I do not herein specifically claim the following subject matter disclosed herein, which matter is claimed in the copending applications noted below:—

The dried acid solid dried sulfite waste liquor, and processes of making such material, claimed in my application 779,516, filed July 17, 1913 (renewed July 17, 1918); the dried and subsequently comminuted sulfite waste liquor acid solids, and the process of making the same, claimed in my application 167,332, filed May 8, 1917; the sulfite liquor solids dried by atomization, claimed in my application 176,279 filed June 22, 1917; the drying of the sulfite liquor by atomization, claimed in my application 118,360 filed August 27, 1917; the binder comprising the redissolved sulfite waste liquor solids dried by atomization, claimed in my application 168,275, filed May 12, 1917.

In mixing the materials of which briquets and similar objects are formed, particularly if mixed in a dry state with the addition of water, it may frequently happen that some portion of the liquor solids do not react with the lime to produce an insoluble product. Since, however, a material part, at least of such solids would be rendered insoluble, I use in one of the appended claims, the expression "insolubilizing at least a portion of the solids of the binder."

In some of the appended claims, the expression "concentrated sulfite waste liquor" covers both the liquid product produced by evaporating a portion of the water, and the solid product produced by removing substantially all the water.

In order to clearly differentiate between such very slow and gradual insolubilizing of the liquor solids, which to a certain extent may occur under service conditions perhaps by atmospheric oxidation thereof, and my invention in which the insolubilization of the liquor solids is effected within a relatively short time, as by the addition of lime or equivalent material at the time of forming the product, I use the expression "artificially insolubilizing said liquor solids."

What I claim is:

1. The process of making briquets or other molded articles which comprises mixing concentrated acid sulfite cellulose waste liquor with a bulking material containing coal dust and fragments and incorporating quicklime material.

2. The process of making briquets or other molded articles which comprises mixing concentrated acid sulfite cellulose waste liquor or its solids with a bulking material and a precipitant for the liquor solids.

3. The process of making briquets or other molded articles which comprises mixing concentrated acid unstable sulfite cellulose waste liquor with a bulking material and quicklime material.

4. The process of making briquets or other shaped articles which comprises incorporating concentrated sulfite cellulose waste liquor or its solids with a bulking material and in artificially insolubilizing said liquor solids.

5. A process of making a shaped article from a bulking material and an acid binder containing the solids of concentrated sulfite cellulose waste liquor, which comprises incorporating said two materials together and insolubilizing at least a portion of the solids of the said binder.

6. The process of making briquets or other shaped articles which comprises incorporating a bulking material and a binding agent comprising atomized dried water-soluble solids of sulfite cellulose waste liquor, in forming into shaped masses, and in insolubilizing said water-soluble solids; whereby a substantially weather-resistant briquet or other molded articles is obtained.

7. In the manufacture of briquets, the step which comprises incorporating a bulking agent with sulfite cellulose waste liquor solids dried by atomization.

8. In the manufacture of briquets, the step which comprises incorporating a bulking agent and calcareous material with sulfite cellulose waste liquor solids dried by atomization.

9. A briquet comprising coal fragments and coagulated sulfite cellulose waste liquor solids which have been dried by atomization.

10. A molded mass comprising fragments of fuel and coagulated sulfite cellulose waste liquor solids which have been dried by atomization.

11. In the manufacture of solid objects, the step which comprises cementing materials together with sulfite cellulose waste liquor solids dried by atomization, to produce such solid objects.

12. In the manufacture of molded masses, the step which comprises incorporating a bulking agent with sulfite cellulose waste liquor solids in a pulverulent form, and an alkaline earth material capable of uniting with said liquor solids to produce an insoluble binding agent.

13. A process which comprises mixing a bulking agent with a binder comprising atomized dried sulfite waste liquor solids, shaping the mass and thereafter artificially insolubilizing said binder.

14. A process which comprises mixing (*a*) a material to serve as a filler, (*b*) dried waste sulfite liquor solids of an acid nature dried by atomization, (*c*) an agent capable of rendering the said solids insoluble, and (*d*) an aqueous liquid, the amount of the latter being sufficient to form the mixture into a plastic mass, then shaping the plastic mass so produced and allowing the mass to set.

15. A process which comprises mixing a bulking agent, dried sulfite waste liquor acid solids in a finely divided state, an insolubilizing agent for the latter, and an aqueous liquid, to produce a plastic mass, and shaping the latter.

16. A process which comprises mixing a bulking agent, dried sulfite waste liquor acid solids in a pulverulent state, an insolubilizing agent for the latter, and an aqueous liquid, to produce a plastic mass, shaping the mass and heating to aid rapid insolubilizing of the waste liquor solids.

17. In the production of shaped products having dried sulfite cellulose waste liquor solids as a binder, the step of insolubilizing the waste sulfite liquor solids in the shaped product by chemical action induced or assisted by heating the mass, whereby the water-solubility of the binder is greatly reduced and a more resistant article produced.

18. In shaping with sulfite waste liquor dry solids of acid reaction, the addition to the said dried solid of an agent capable of insolubilizing the same, and a bulking material, all in a solid state.

19. In the manufacture of shaped products, the step of insolubilizing sulfite waste liquor solids of an acid nature, said step being effected while heating such products.

20. A process of briqueting fine materials containing coal which comprises mixing the same in a solid state with atomized and dried sulfite waste liquor solids, and alkaline-earth-metal-oxid-containing material, and then with an aqueous vehicle to produce a plastic mass, and shaping the latter into pieces of appropriate size for use as fuel.

21. The process herein described for briqueting finely divided fuel material consisting in mixing with such material in a suitable state of division, a dry powder containing lime material and sufficient additional substances of an acid nature to give adhesiveness and plasticity to the mass, then moistening the mixed mass, and then briqueting the moistened mass.

22. In producing fuel, the step of mixing solid relatively fine carbonaceous fuel material, acid sulfite waste liquor solids in a dry state and an agent which, upon the subsequent addition of water, is capable of insolubilizing the said liquor solids.

23. Fuel made by mixing fine fuel material, sulfite waste liquor dry solids and an alkaline earth, moistening and shaping the mass.

24. In a process of producing shaped articles from material reduced to a suitable state of division, mixing therewith a dry somewhat acid powder containing solid matter derived from waste sulfite liquor, moistening the mixed mass, then shaping the mass, and insolubilizing the binder.

25. Fine fuel bonded by sulfite waste liquor solids rendered insoluble in water.

26. A process which comprises mixing a material to serve as a filler, dried pulverulent sulfite waste liquor solids of an acid nature, an agent capable of rendering said solids insoluble and an aqueous liquid in amount sufficient to form the mixture into a plastice mass; and thereafter shaping the plastic mass so produced and allowing the same to set.

27. A process which comprises mixing fine fuel with dried comminuted sulfite waste liquor solids, an agent capable of insolubilizing the latter and an aqueous liquid in such proportions as to produce a plastic mass, and then shaping the latter.

28. A process which comprises mixing a bulking agent, sulfite waste liquor acid solids in a powdery state, an agent capable of insolubilizing the latter and an aqueous liquid in such proportions as to produce a plastic mass, and then shaping the latter.

29. A process which comprises first producing a dry mixture of dried and finely divided sulfite waste liquor solids, a bulking agent, an agent capable of insolubilizing the waste liquor solids, and an aqueous liquid in such proportions as to produce a plastic mass, shaping the mass and heating to aid rapid insolubilization of the waste liquor solids.

30. A process of briqueting fine coal which comprises the mixing of the same with sulfite waste liquor solids dried and in a comminuted condition, an alkaline earth material capable of insolubilizing the latter, then mixing with such mass an aqueous liquid in an amount capable of producing a plastic mass and shaping the latter.

31. In producing briquet fuel, the step of mixing solid relatively fine carbonaceous fuel materials, sulfite waste liquor solids in a dried finely divided condition and a calcareous material.

32. A shaped product comprising a filler bonded by sulfite waste liquor solids rendered substantially insoluble in water.

33. A shaped product comprising a filler bonded by a binder comprising sulfite waste liquor solids, at least a large portion of such solids being insolubilized.

Signed at Montclair, in the county of Essex and State of New Jersey, this 14th day of March, 1919.

CARLETON ELLIS.